United States Patent
Kim et al.

(10) Patent No.: US 7,932,822 B2
(45) Date of Patent: Apr. 26, 2011

(54) APPARATUS AND METHOD FOR TRACKING POSITION ON HANDHELD DEVICE

(75) Inventors: Jae Chul Kim, Daejeon (KR); Tae Wook Heo, Daejeon (KR); Ju Wan Kim, Daejeon (KR); Jong Hyun Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 229 days.

(21) Appl. No.: 12/090,384

(22) PCT Filed: Dec. 26, 2005

(86) PCT No.: PCT/KR2005/004528
§ 371 (c)(1),
(2), (4) Date: Apr. 16, 2008

(87) PCT Pub. No.: WO2007/049840
PCT Pub. Date: May 3, 2007

(65) Prior Publication Data
US 2008/0284588 A1    Nov. 20, 2008

(30) Foreign Application Priority Data
Oct. 28, 2005   (KR) .................. 10-2005-0102482

(51) Int. Cl.
*G08B 1/08* (2006.01)
(52) U.S. Cl. ............... 340/539.13; 340/825.36; 340/988
(58) Field of Classification Search ............. 340/539.13, 340/539.11, 539.1, 825.36, 825.49, 989–990, 340/988, 573.4
See application file for complete search history.

(56) References Cited

U.S. PATENT DOCUMENTS

| 4,896,650 | A  | * | 1/1990  | Hait ............................. 126/9 R |
| 5,289,163 | A  | * | 2/1994  | Perez et al. ............... 340/539.32 |
| 5,519,758 | A  | * | 5/1996  | Tabbane ....................... 455/405 |
| 2003/0190921 | A1 | * | 10/2003 | Stewart ..................... 455/456.3 |
| 2003/0225589 | A1 | * | 12/2003 | Eaton et al. ..................... 705/1 |
| 2004/0033796 | A1 | * | 2/2004  | Remy ........................ 455/404.2 |
| 2005/0143096 | A1 | * | 6/2005  | Boesch ...................... 455/456.3 |
| 2007/0037605 | A1 | * | 2/2007  | Logan .......................... 455/567 |

FOREIGN PATENT DOCUMENTS

| JP | 2002-262336  |   | 9/2002 |
| JP | 2002-262354  | A | 9/2002 |
| JP | 2003-174396  | A | 6/2003 |
| JP | 2004-005511  | A | 1/2004 |
| JP | 2004-127229  |   | 4/2004 |
| JP | 2005-080071  |   | 3/2005 |
| WO | 2004/003705  |   | 1/2004 |

* cited by examiner

*Primary Examiner* — Daniel Previl
(74) *Attorney, Agent, or Firm* — Ladas & Parry LLP

(57) ABSTRACT

An apparatus for locating a mobile device includes a receiving unit receiving a trigger profile including predetermined zone information and a triggering rule about the generation of an alarm signal at the moment of entering and exiting of the predetermined zone, a location identifying unit locating a present location, a zone in/out detection unit generating the alarm signal according to the triggering rule based on the trigger profile and the present location located by the location identifying unit when entering the predetermined zone or exiting the predetermined zone, and a transmission unit transmitting the present location information identified by the location identifying unit when the alarm signal is generated.

9 Claims, 8 Drawing Sheets

APPARATUS AND METHOD FOR TRACKING POSITION ON HANDHELD DEVICE

TECHNICAL FIELD

The present invention relates to an apparatus and method for locating a user of a mobile wireless telecommunications or handheld device by generating trigger signal when moving into or out of a zone.

BACKGROUND ART

In an existing triggering system, it is a problem that, since the system relies only on the global positioning system (GPS) and is configured on a server base, when a user enters a room from an open space, reliability in a triggering result is deteriorated and overload of a server is generated due to the lack of indoor location locating signal processing. That is, as the number of locating objects increases, load of a location locating server rapidly increases. Also, since a GPS signal is only relied on in locating a location, when a user carrying a mobile phone moves from the open space to a room, the server fails to obtain location information so that accurate triggering cannot be performed.

In an existing mobile phone based location trigger, a location is located by a mobile location center (MPC) of a telecommunications company and service is provided only when the location information of each mobile phone is downloaded from the server to enjoy a particular service on each mobile phone. In this case, the load of the server increases with the increase in the number of mobile phones and the amount of requested calculations. In particular, when calculation on the space of a mobile phone is performed at the server, service may not be appropriately provided due to the excessive amount of calculations.

Also, when a user enters a room from the open space, the GPS signal is discontinued so that the current location of the mobile phone cannot be located. Since only the information of a local station connected to the mobile hone can be obtained, accurate position information cannot be obtained. Furthermore, it is inconvenient that an additional apparatus to obtain the position information of an RFID tag installed at an entrance of a building is required.

DISCLOSURE OF INVENTION

To solve the above and other problems, the present invention provides an apparatus and method for locating a mobile device which enables identification of the present location of the mobile device not only in an open space but also in a closed space such as a room and sending of an alarm when a user carrying the mobile device enters or exits the closed space by performing space calculation on the mobile device based on a zone in which the user exits, thus reducing a load of a server.

Accordingly, the present invention provides an apparatus for locating a mobile device includes a receiving unit receiving a trigger profile including predetermined zone information and a triggering rule about the generation of an alarm signal at the moment of entering and exiting of the predetermined zone, a location identifying unit locating a present location, a zone in/out detection unit generating the alarm signal according to the triggering rule based on the trigger profile and the present location located by the location identifying unit when entering the predetermined zone or exiting the predetermined zone, and a transmission unit transmitting the present location information identified by the location identifying unit when the alarm signal is generated.

The present invention provides a method for locating a mobile device, the method includes receiving a trigger profile including predetermined zone information and a triggering rule about the generation of an alarm signal at a moment of the entering and exiting of the predetermined zone, locating a present location, determining whether the located present location is moved into the predetermined zone from the outside of the predetermined zone or moved from the predetermined zone to the outside of the predetermined zone, generating an alarm signal according to the triggering rule when the present location is moved into the predetermined zone or moved out of the predetermined zone, and transmitting the located present location with the alarm signal when the alarm signal is generated.

BEST MODE FOR CARRYING OUT THE INVENTION

Figure 1:
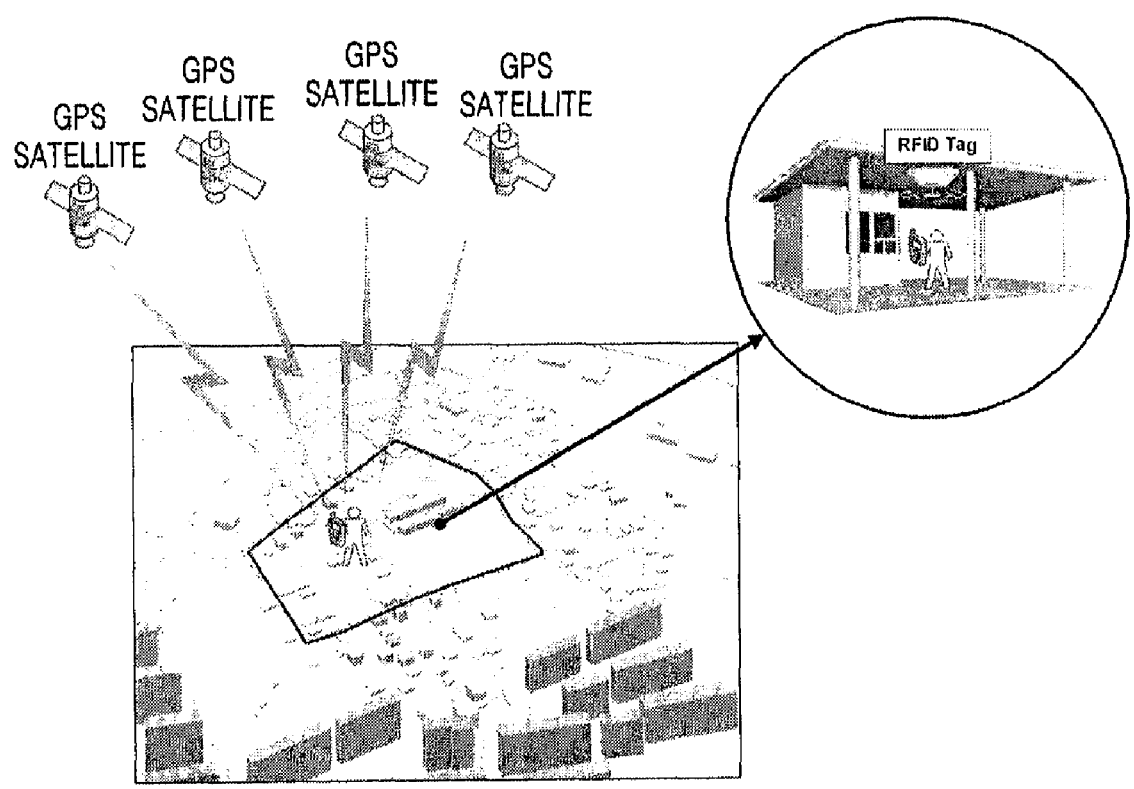
FIG. 1 is a view showing the concept of locating a mobile device according to an embodiment of the present invention.

The present invention will now be described more fully with reference to the accompanying drawings, in which exemplary embodiments of the invention are shown. Like reference numerals in the drawings denote like elements. In the following description, when detailed descriptions on the related known functions or structures are determined to unnecessarily obscure the gist of the present invention, the descriptions will be omitted FIG. 1 is a view showing the concept of locating a mobile device according to an embodiment of the present invention. Referring to FIG. 1, an apparatus for locating a mobile device according to an embodiment of the present invention identifies the position of a user carrying the mobile device locating apparatus using a global positioning system (GPS). In addition to the locating in an open space using the GPS, the mobile location locating apparatus can locate the location in a closed space using a radio frequency identification (RFID) tag, which will be described in detail with reference to FIG. 2.

Figure 2:
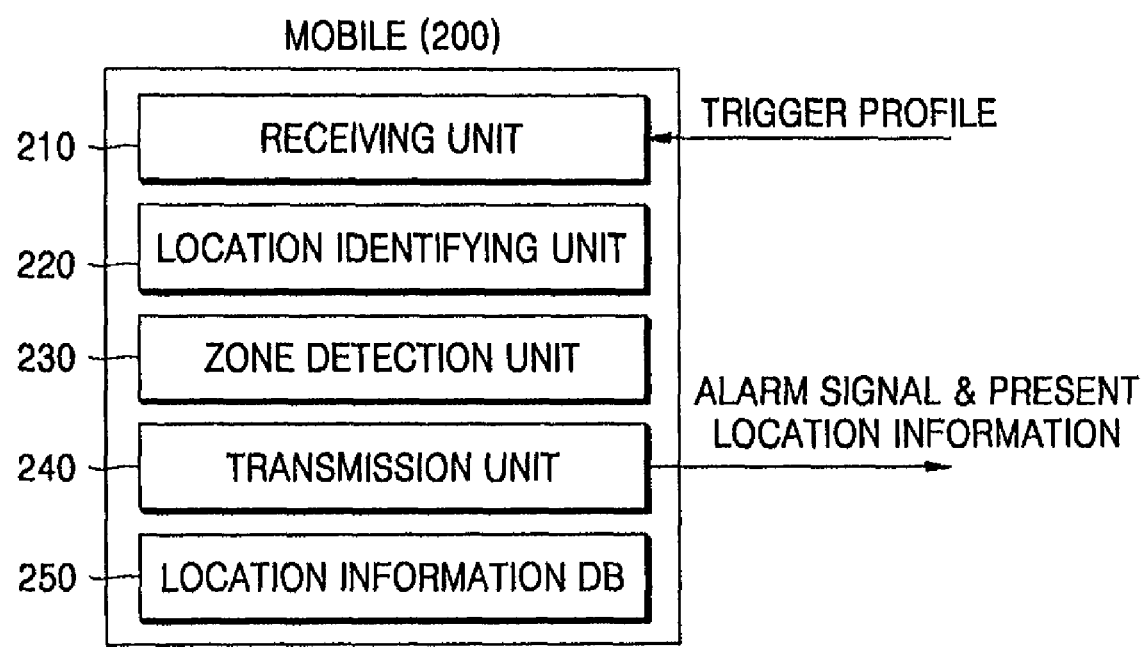
FIG. 2 is a block diagram showing the configuration of an apparatus for locating a mobile device according to an embodiment of the present invention.

FIG. 2 is a block diagram showing the configuration of an apparatus for locating a mobile device according to an embodiment of the present invention. Referring to FIG. 2, a mobile device locating apparatus 200 includes a receiving unit 210, a location identifying unit 220, a zone in/out detection unit 230, a transmission unit 240, and a location information database unit 250.

The receiving unit 200 receives a trigger profile that a server transmits. The trigger profile is a profile message that the server requests generation of triggering when entering or exiting an arbitrary zone or any present administrative district such as a metropolitan city (province), a city, a county, or a district. The trigger profile includes a triggering rule set based on a user, a zone, time, and velocity.

The location identifying unit 220 locates the present location of the mobile device locating apparatus using the GPS and RFID. That is, the position of a user carrying the mobile device locating apparatus such as a mobile phone or PDA is located on a map using the GPS. Even when the user enters a room of a building, the position of the user can be continuously located regardless of the user being indoor or outdoor by obtaining an RFID signal from an RFID tag attached to an entrance of the building. An RFID determination unit installed in the mobile device obtains indoor location information stored in the RFID tag.

The zone in/out detection unit 230 determines whether the user enters or exits a predetermined zone based on information on the zone included in the trigger profile received from the server and the present location of the user identified by the location identifying unit 220. That is, the zone in/out detection unit 230 performs triggering based on the zone. The space calculation is performed on the mobile device locating apparatus based on the information on the zone included in the received trigger profile, the preset triggering rule, and the present location of the user so that an alarm signal is generated according to the triggering rule when the user enters or leave the predetermined zone.

When the zone in/out detection unit 230 generates the alarm signal, the transmission unit 240 transmits to the server location information, time, and in/out information with the alarm signal that notifies the in/out of the predetermined zone by tuning the information on the present location of the user identified by the location identifying unit 220 of the mobile device locating apparatus to the triggering time and velocity arbitrarily set based on the triggering rule.

The location information database unit 250 accumulatively stores and manages the location information transmitted by the transmission unit 240 with the alarm signal and the information on the predetermined zone for which the triggering profile requests triggering.

Figure 3:
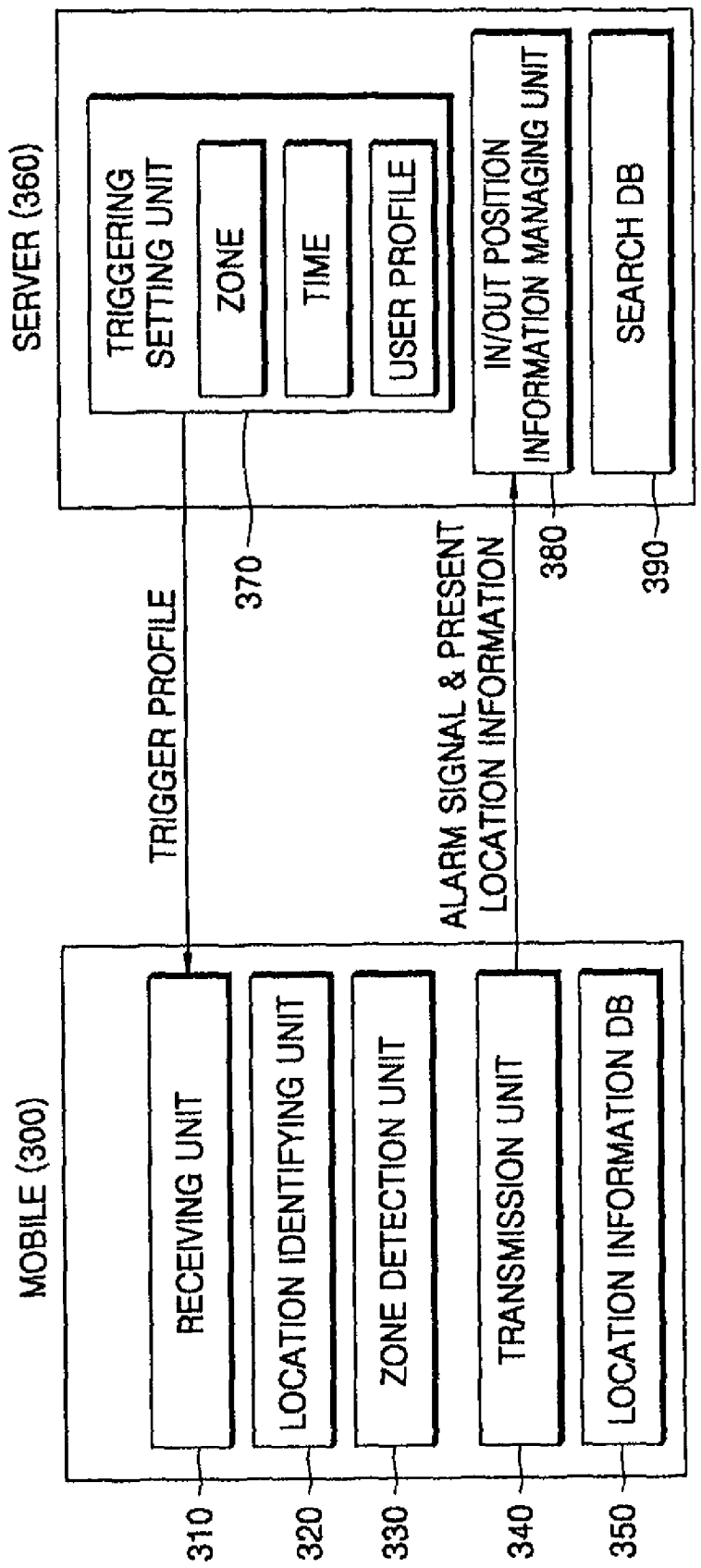
FIG. 3 is a block diagram showing the configuration of a server for performing locating a user carrying the mobile device and the apparatus of FIG. 2.

FIG. 3 is a block diagram showing the configuration of a server for performing locating of the position of a user carrying the mobile device and the apparatus of FIG. 2. Since the constituent elements of a mobile device locating apparatus 300 of FIG. 3 correspond to those of the mobile device locating apparatus 200 of FIG. 2, detailed descriptions thereof will be omitted herein.

In FIG. 3, a server 360 includes a triggering setting unit 370, a location and in/out information management unit 380, and a search database (DB) unit 390. The server 360 sets a triggering zone rule of the mobile device locating apparatus 300 for which the location is identified or located, manages the position of the mobile device locating apparatus 300 that is being located, receives an alarm signal notifying that the mobile device locating apparatus 300 has entered or left the triggering zone and the present location of the mobile device locating apparatus 300, and manages the information.

The triggering setting unit 370 sets a triggering profile for each user of the mobile device locating apparatus 300. The triggering profile includes information on an arbitrary zone or any present administrative district such as a metropolitan city, a city, a county, or a district and information on the triggering rule such as time and velocity.

The location and in/out information management unit 380 receives the alarm signal from the transmission unit 340 of the mobile device locating apparatus 300 that the mobile device locating apparatus 300 enters or exits an arbitrary zone set in the triggering profile, and the present location information of the mobile device locating apparatus 300 that is identified by the location identifying unit 320 of the mobile device locating apparatus 300.

The search database unit 390 accumulatively stores the information received from the location and in/out information management unit 380 and searches the information for locating the user, to identify the present state of the user carrying the mobile device locating apparatus 300. Also, the search database unit 390 includes a map database concerning a zone to set the triggering zone.

Figure 4:
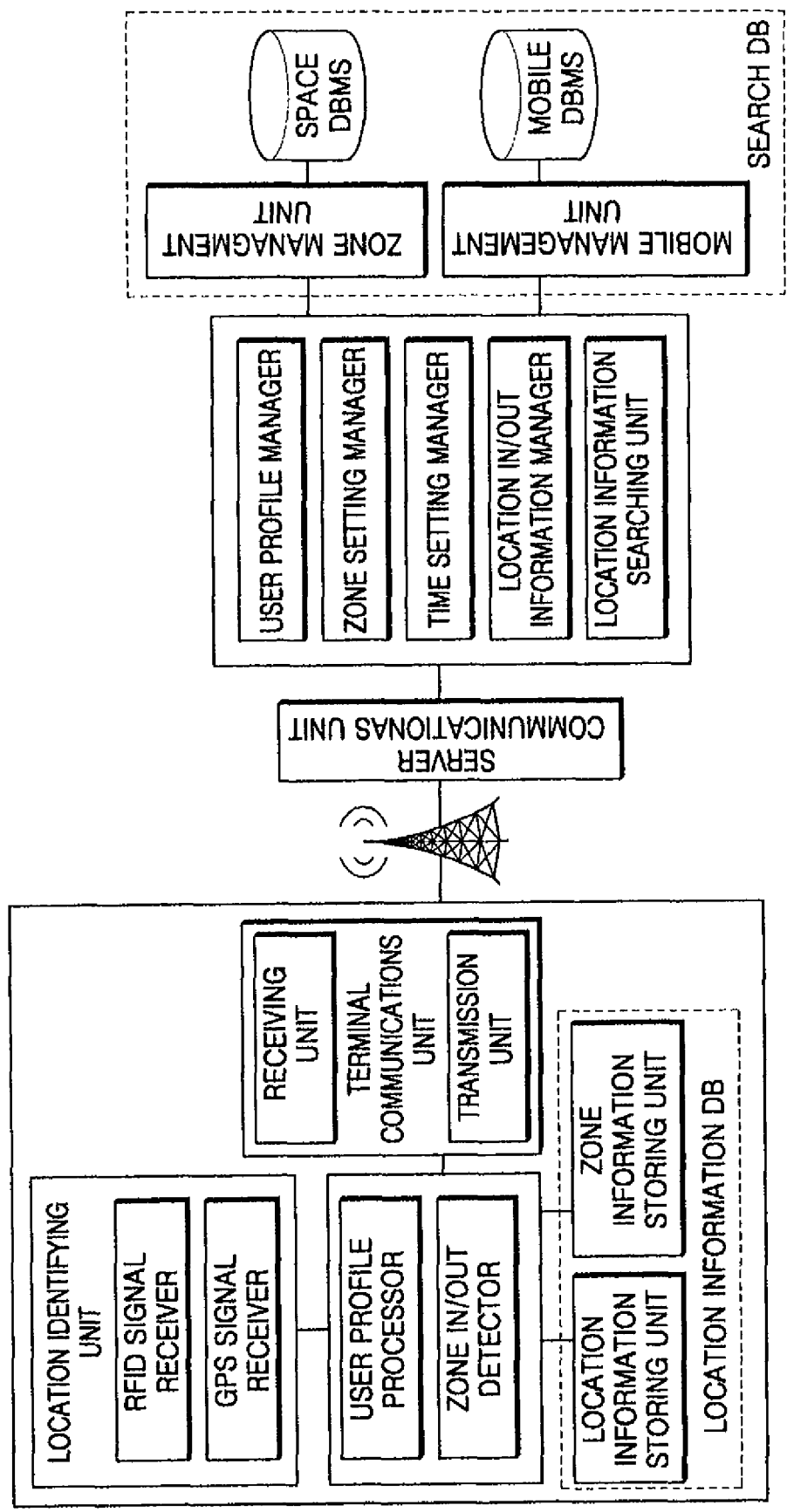
FIG. 4 is a block diagram showing the server and the apparatus of FIG. 2.

FIG. 4 is a block diagram showing the server and the apparatus of FIG. 2. The server sets the triggering profile for each user. The triggering profile for setting the triggering rule based on factors such as a user, a zone, time, and velocity is transmitted to the mobile device locating apparatus.

The mobile device locating apparatus receives the triggering profile, processes a profile for each user from the triggering profile, detects whether the mobile device locating apparatus enters or exits the zone based on the triggering zone information in the triggering profile, generates an alarm signal, and transmits the alarm signal to the server through the transmission unit by adding the location information to the alarm signal. The location identifying unit can continuously obtain the position of the user regardless of the user being indoor or outdoor through an RFID signal obtainer and a GPS signal obtainer.

The server manages the alarm signal and the location information received from the location and in/out information management unit. The alarm signal and the location information are stored in and managed by the location information database unit in the mobile device locating apparatus and the search database unit in the server.

Figure 5A:
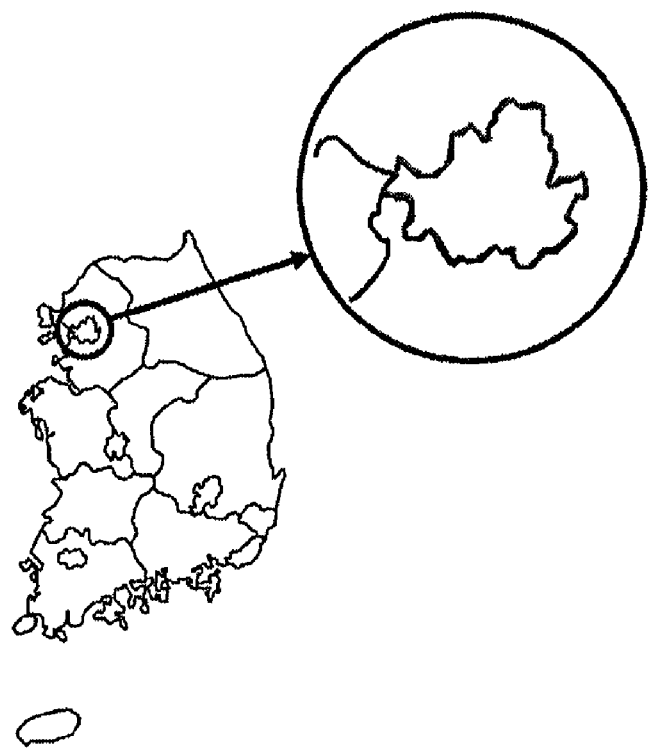
FIGS. 5A through 5D show a zone polygon set for a zone trigger.
Figure 5B:
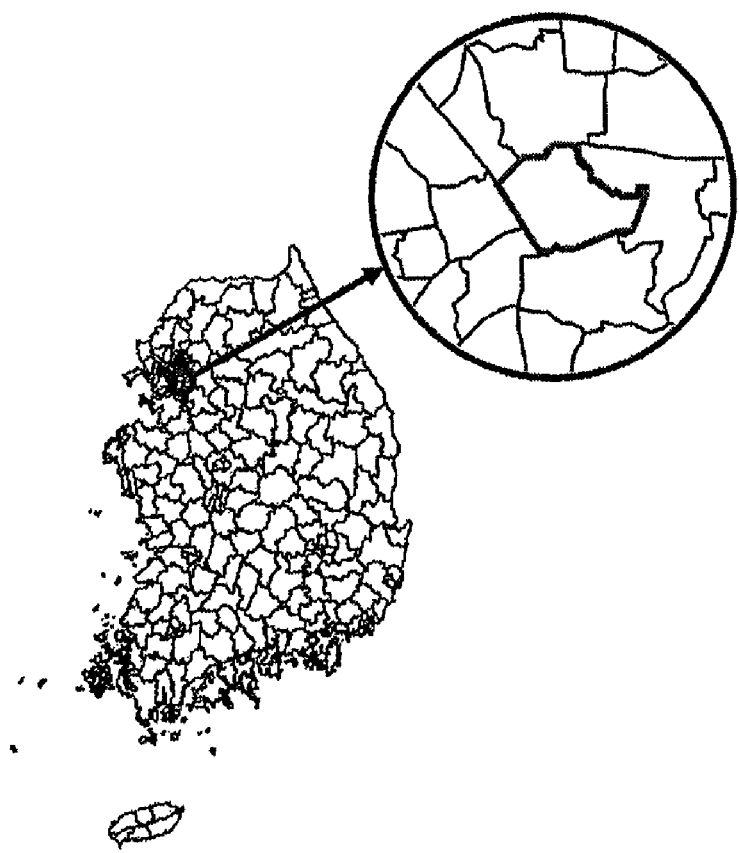
Figure 5C:
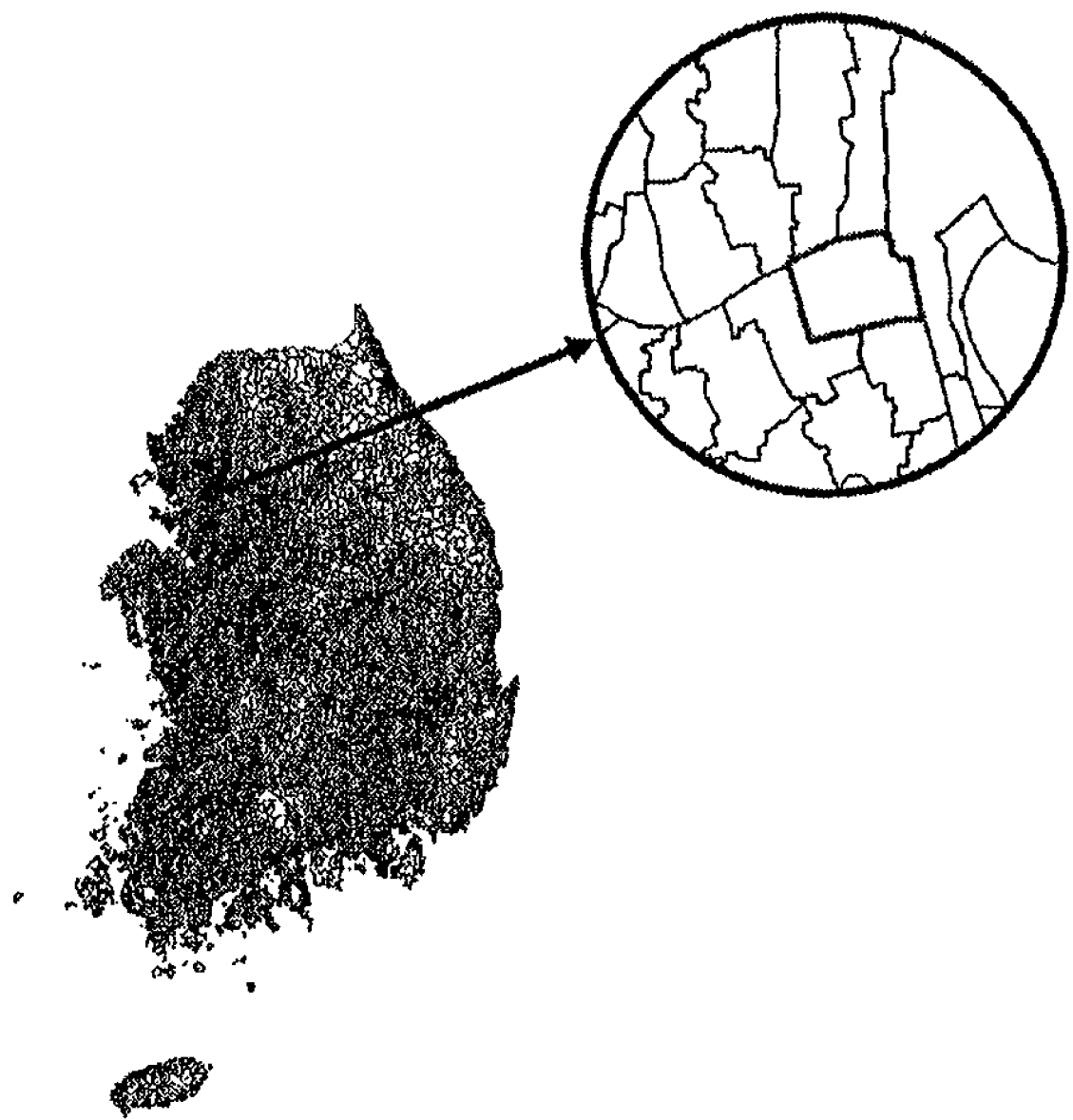
Figure 5D:
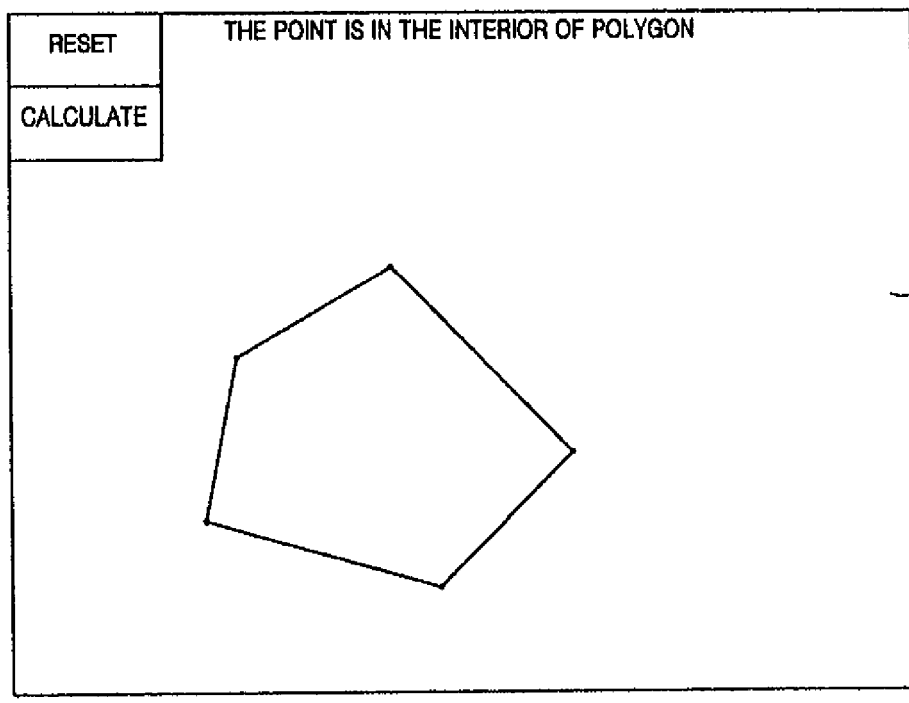
Figure 5D:
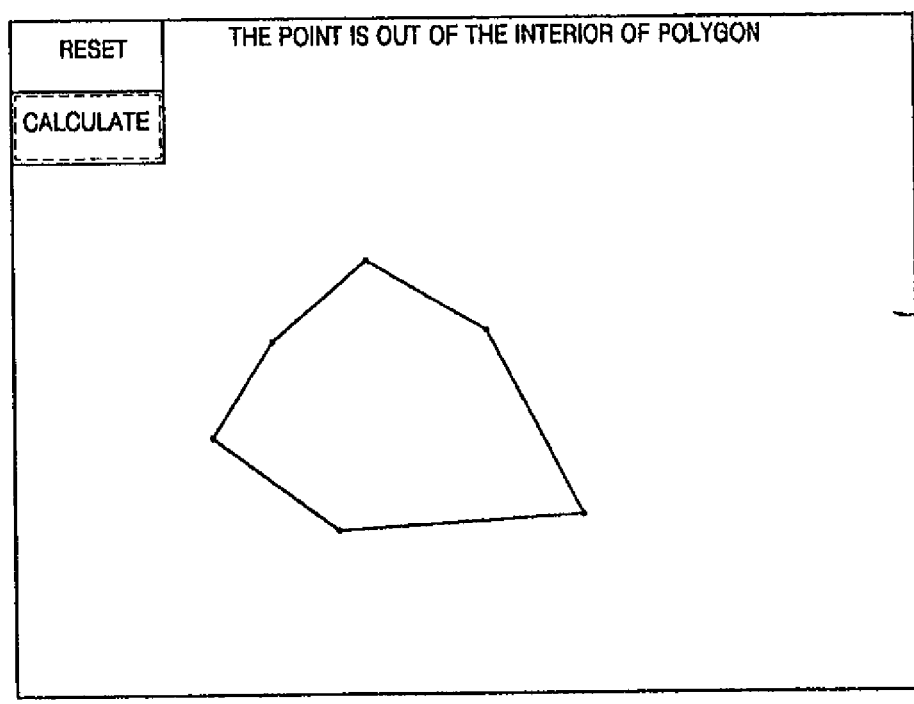

FIGS. 5A through 5D show a zone polygon set for a zone trigger. Each of FIGS. 5A, 5B, and 5C respectively illustrates the zone polygons of a metropolitan city (province), a city and county area, and a district. FIG. 5D illustrates a case 510 in which a user carrying a mobile device having a location locating function exists in a predetermined zone, that is, in the interior of a polygon, and a case 520 in which the user exist out of the polygon.

Figure 6:
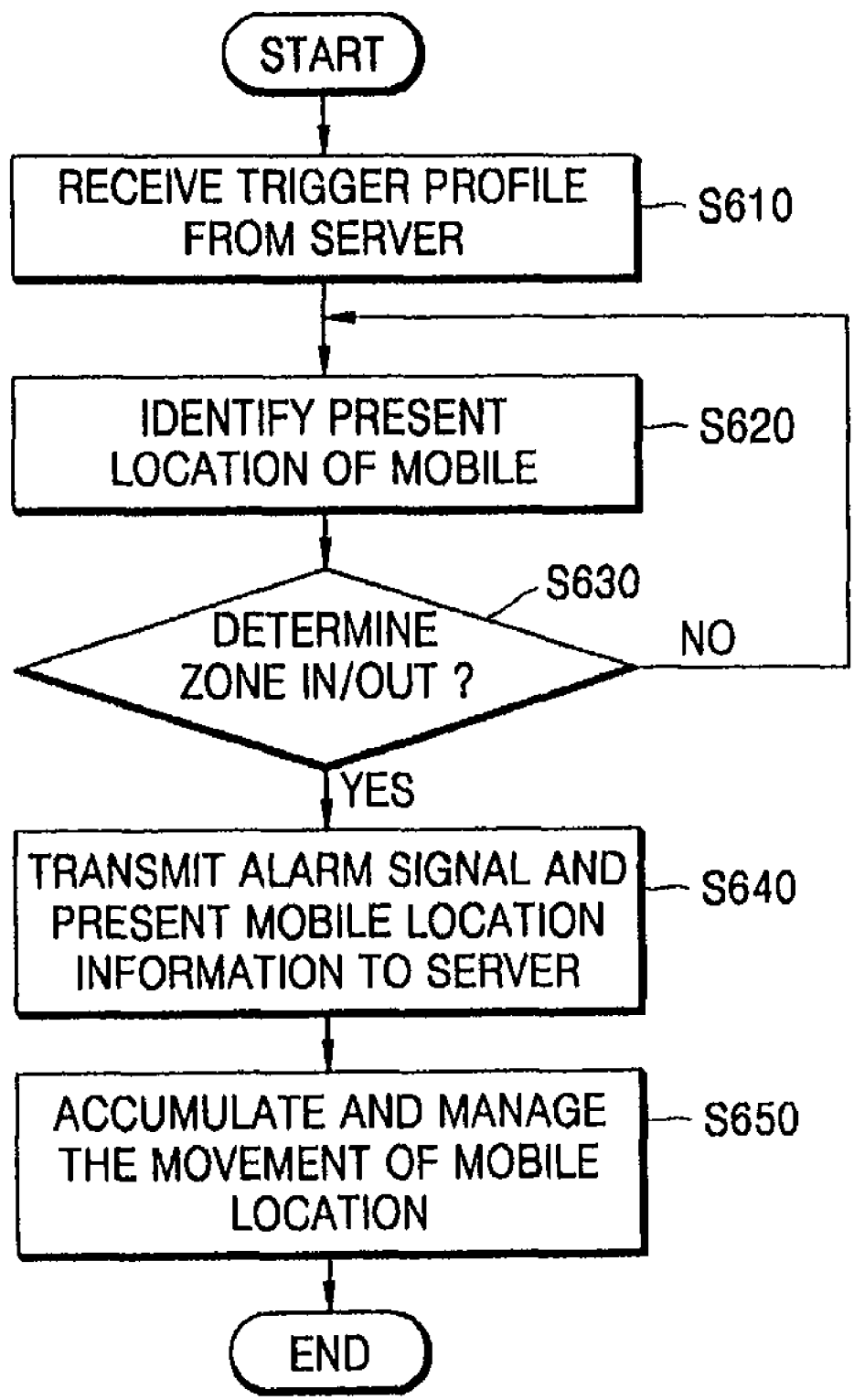
FIG. 6 is a flow chart for implementing the location locating on a mobile device.

FIG. 6 is a flow chart for implementing the location of a mobile device. Referring to FIG. 6, the mobile device locating apparatus receives from the server the trigger profile that requests triggering by defining rules such as time and velocity with respect to an arbitrary zone polygon for each user (S610). The mobile device locating apparatus locates the present location using the GPS and RFID signals (S620), and detects the entering and exiting of the zone polygon by comparing the located present location of the mobile device locating apparatus with the zone polygon requesting triggering in the trigger profile (S630).

When the in/out is generated, the mobile device locating apparatus generates and transmits the alarm signal and simultaneously transmits the present location information of the mobile device locating apparatus and other situation information (S640). Then, the mobile device locating apparatus accumulatively stores and manages the alarm signal and the location signal to locate and manage the position of the mobile device locating apparatus (S650).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

While this invention has been particularly shown and described with reference to preferred embodiments thereof, it will be understood by those skilled in the art that various changes in form and details may be made therein without departing from the spirit and scope of the invention as defined by the appended claims.

As descried above, in the mobile device locating apparatus according to the present invention, since the RFID determination unit is installed in a mobile phone in addition to locating a mobile phone user using GPS, the user can be continuously located regardless of the user being indoor or outdoor.

Thus, the increase in the load of the server occurring when the location is located based on the GPS signal only is prevented. The accuracy of triggering is improved when the user enters a room for which the obtainment of information is difficult.

Furthermore, the mobile device locating apparatus according to the present invention is capable of independently locating the location and independently performs triggering during the entering and exiting of the zone that the server requests. Therefore, even when the triggering zone increases or triggering objects increase, the load on the server is not increased.

What is claimed is:

1. An apparatus for locating a mobile device, the apparatus comprising:
   a receiving unit receiving a trigger profile including predetermined zone information and a triggering rule about a generation of an alarm signal when entering and exiting of a predetermined zone, wherein the triggering rule is based on a user, the predetermined zone, a time, and a velocity;
   a location identifying unit locating a present location;
   a zone in/out detection unit generating the alarm signal according to the triggering rule based on the trigger profile and the present location located by the location identifying unit when entering or exiting the predetermined zone; and
   a transmission unit transmitting the present location information identified by the location identifying unit when the alarm signal is generated.

2. The apparatus of claim 1, wherein the location identifying unit comprises an RFID tag signal reader.

3. The apparatus of claim 1, wherein the location identifying unit identifies the present location based on a signal received from a GPS satellite.

4. The apparatus of claim 1, wherein the transmission unit controls a transmission time interval and a transmission velocity when transmitting the present location.

5. The apparatus of claim 1, further comprising a location information database unit which stores the present location information accumulatively transmitted from the transmission unit when the alarm signal is generated.

6. A method for locating a mobile device, the method comprising:
   receiving a trigger profile including predetermined zone information and a triggering rule about a generation of an alarm signal when entering and exiting of a predetermined zone, wherein the triggering rule is based on a user, the predetermined zone, a time, and a velocity;
   locating a present location;
   determining whether the located present location is moved into or outside of the predetermined zone;
   generating an alarm signal according to the triggering rule when the present location is moved into or out of the predetermined zone; and
   transmitting the located present location with the alarm signal when the alarm signal is generated.

7. The method of claim 6, wherein the locating of the present location further comprises locating a location using an RFID tag.

8. The method of claim 6, wherein, in the locating of the present location, the present location is located based on a signal received from a GPS satellite.

9. The method of claim 6, further comprising managing records of transmission of the located present location information accumulatively when the alarm signal is generated.

* * * * *